United States Patent [19]

McMurtrey

[11] Patent Number: 4,730,758
[45] Date of Patent: Mar. 15, 1988

[54] DETACHABLE BICYCLE BASKET

[75] Inventor: David K. McMurtrey, Maysville, Ky.

[73] Assignee: Wald Manufacturing Co., Inc., Maysville, Ky.

[21] Appl. No.: 821,025

[22] Filed: Jan. 21, 1986

[51] Int. Cl.⁴ .............................................. B62J 7/06
[52] U.S. Cl. ........................................ 224/36; 224/31; 224/41
[58] Field of Search .................... 224/30 R, 30 A, 31, 224/32 R, 35, 36, 39, 41, 42

[56] References Cited

U.S. PATENT DOCUMENTS

| | | |
|---|---|---|
| 562,744 | 6/1896 | Ruff ...................................... 224/36 |
| 605,188 | 6/1898 | Rondell . |
| 2,287,531 | 6/1942 | Ong . |
| 2,492,595 | 12/1949 | Rhoer . |
| 2,498,446 | 2/1950 | Pawsat . |
| 2,805,806 | 9/1957 | Glenny . |
| 2,889,096 | 6/1959 | Glenny . |
| 3,080,100 | 3/1963 | Glenny . |
| 3,517,867 | 6/1970 | Fritz et al. . |
| 3,603,549 | 9/1971 | Brilando et al. . |
| 3,853,253 | 12/1974 | Hawkins et al. . |
| 4,056,219 | 11/1977 | Hine, Jr. . |
| 4,282,993 | 8/1981 | Humlong . |

FOREIGN PATENT DOCUMENTS

| | | |
|---|---|---|
| 83325 | 3/1954 | Norway ................................. 224/30 |
| 33981 | 5/1905 | Switzerland . |
| 505166 | 5/1939 | United Kingdom ................... 224/36 |
| 708207 | 4/1954 | United Kingdom . |

OTHER PUBLICATIONS

Spencer Basket—British Made (three photographs).
Taiwan Bicycle Director 1985 Buyer's Guide, Bicycle Today, p. 213.

Primary Examiner—Henry J. Recla
Assistant Examiner—David Voorhees
Attorney, Agent, or Firm—Wood, Herron & Evans

[57] ABSTRACT

A basket assembly which provides for quick and easy detachment of a basket from a basket supporting bracket mounted to a bicycle includes locking elements selectively interconnecting the handle of the basket to the basket supporting bracket for releasably locking the basket to the basket supporting bracket. The locking elements include a slotted locking bracket which is mounted to the basket supporting bracket, and an elongated leg formed at each end of the basket handle. The handle is movable between an upright position in which the elongated leg is aligned with and insertable into the slot of the locking bracket, and a horizontal position in which the elongated leg is moved perpendicular to the slot. The basket is easily removed from the basket supporting bracket with the handle in an upright, unlocked position, and locked securely to the basket supporting bracket with the handle in a horizontal, locked position.

12 Claims, 3 Drawing Figures

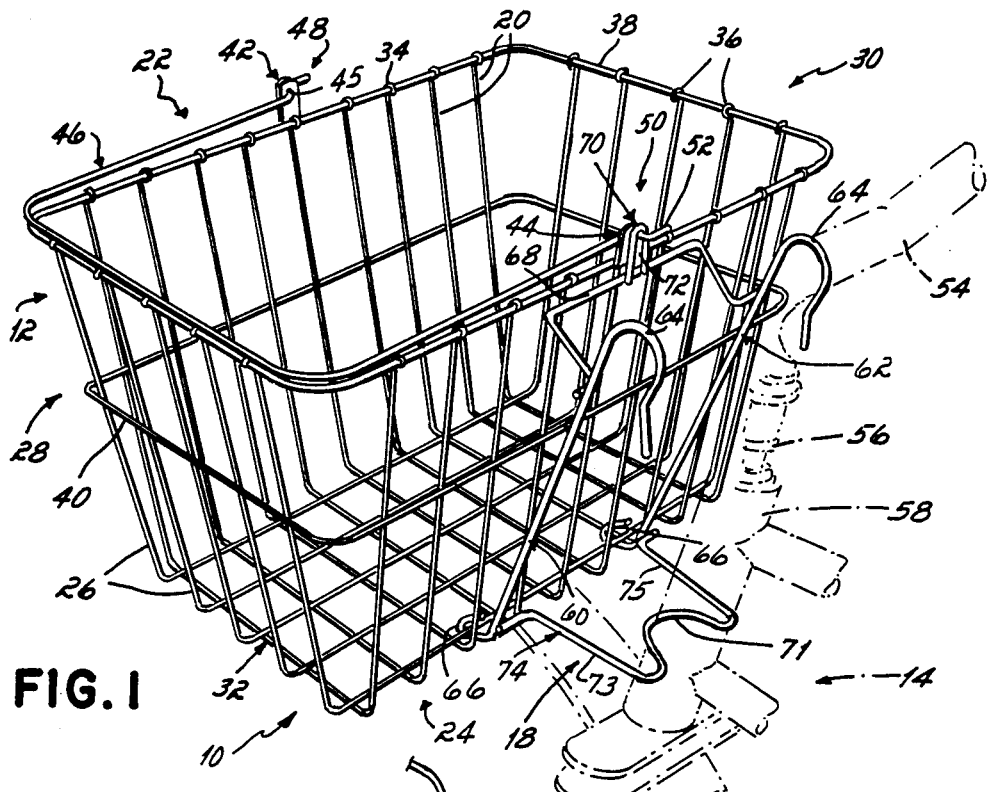
FIG. 1
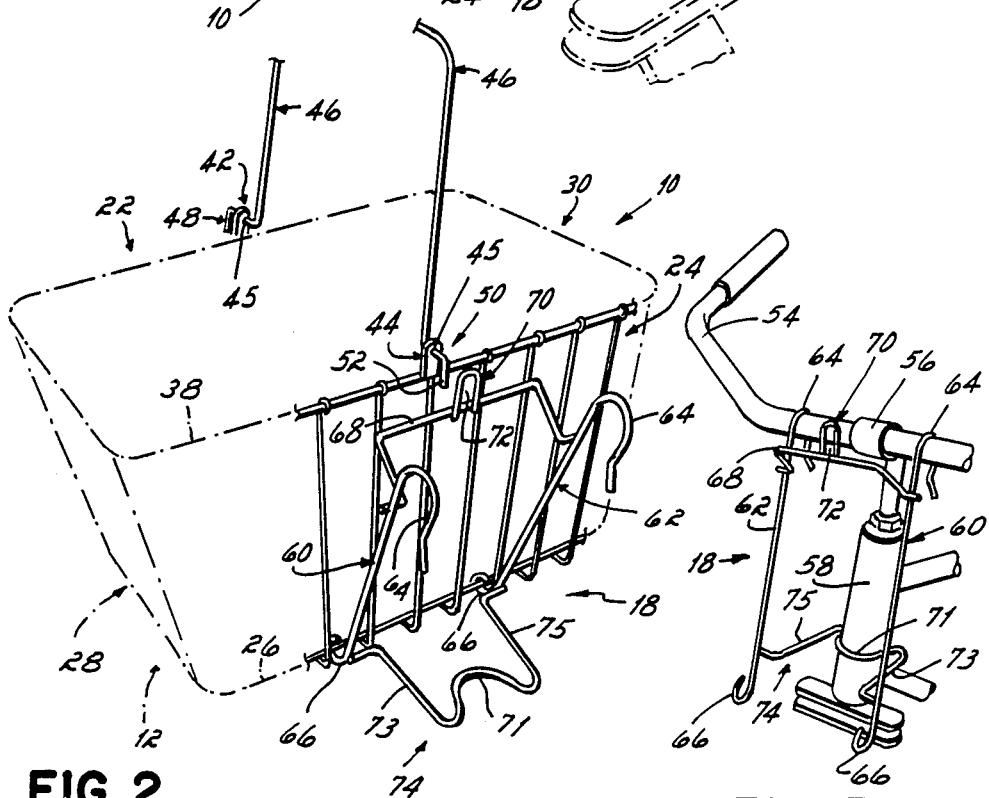
FIG. 2
FIG. 3

DETACHABLE BICYCLE BASKET

BACKGROUND OF THE INVENTION

This invention relates to baskets for bicycles and the like, and, more particularly, to a basket assembly including a basket supporting bracket adapted to mount to the frame of a bicycle and a basket which is detachably mounted to the basket supporting bracket by means of quick release locking elements.

There are many designs for essentially permanently mounting baskets to the front or rear portions of the frame of a bicycle, tricycle and the like. Many of these designs include support arms which mount to the axle of either the front or rear wheel of the bicycle, and other hardware adapted to mount to the bicycle frame. Baskets mounted to bicycles in this fashion have proven entirely satisfactory for transporting items from place to place on the bicycle. However, since the basket is fixed to the bicycle, it cannot be carried with the rider to transport items to and from the bicycle.

A solution to this problem has been proposed in several prior art basket assemblies in which the basket is detachably mounted to a basket supporting bracket or other mounting structure which remains fixed to the frame of the bicycle. Examples of prior art basket assemblies which provide for the detachment of the basket from the bicycle include U.S. Pat. Nos. 3,517,867; 4,056,219; and British Pat. No. 708,207.

These prior art basket assemblies though are all characterized by limitations or problems. For example, the basket assembly of U.S. Pat. No. 3,517,867 is characterized by a detachable basket which is secured to the bicycle by a pair of relatively expensive and complex clamps which are not easily removable from the bicycle. The basket assembly of U.S. Pat. No. 4,056,219 is characterized by a basket which is not easily and quickly removable from the supporting bracket. Additionally, the basket supporting bracket of U.S. Pat. No. 4,056,219 is dangerous in that it creates two forwardly facing potential spears when the basket is removed. The basket assembly of British Pat. No. 708,207 is characterized by a basket which is easily removable from its supporting basket, but the basket is not locked to the bracket and could be easily jarred off of the bracket. Further, the basket assembly of this British patent is characterized by a relatively complex and expensive supporting bracket which is not easily removable from the bicycle.

SUMMARY OF THE INVENTION

It is therefore among the objects of the this invention to provide a basket assembly of the type having a basket supporting bracket adapted to easily and quickly mount to the bicycle frame without the use of any loose parts such as nuts and bolts and without the use of any tools. It is another object of this invention to provide a basket assembly in which the basket is very quickly and easily unlocked and detached or reattached and locked to the basket supporting bracket, and in which the basket supporting bracket remains mounted to the bicycle frame upon unlocking and detachment of the basket from the supporting bracket.

These objectives are accomplished in a basket assembly according to this invention which comprises a basket having a pivotal handle, and a basket supporting bracket adapted to be mounted to the handlebars and head tube of a bicycle frame. The basket supporting bracket includes a pair of outwardly extending hooks adapted to support the bottom of the basket, the top of which is releasably locked to the basket by cooperating locking elements. One of the locking elements is formed on the basket supporting bracket and the other on the handle of the basket. When the handle is lifted into an upright, vertical position to permit carrying of the basket by the handle, the locking element of the basket handle is automatically moved into a position to disengage the locking element of the bracket which permits removal of the basket from the basket supporting bracket. With the locking elements of the bracket and handle engaged, locking of the handle results from the handle pivoting 90° from the upright position to a generally horizontal position atop the basket. This lowering of the handle results in automatic locking of the locking elements of the handle and bracket so as to secure the basket to the basket supporting bracket.

More specifically, the basket supporting bracket of this invention includes a pair of spaced rods, each formed with a rearwardly facing upper hook at one end and a forwardly facing lower hook at the opposite end. The rods are interconnected at their upper ends by a forwardly facing generally U-shaped brace having a locking element formed with a slot therein. The lower ends of the rods are connected to a lower, rearwardly facing generally M-shaped brace having an arcuate center section. The basket supporting bracket is mounted to the bicycle frame by placing the upper hooks of the rods over the handlebars, and resting the arcuate section of the lower M-shaped brace against the head tube of the bicycle frame.

In a presently preferred embodiment, the basket comprises two sets of generally U-shaped web wires. Each set comprises multiple parallel wires. One set of web wires is disposed transverse to the other set, and they are all interconnected at their points of intersection by welding or brazing to form a basket having four sides, a bottom and an open top. The top of each web wire is connected to a top perimeter wire. Preferably, there is a second perimeter wire medially spaced between the top and bottom of the basket.

A pair of handle mounting clips, each having a throughbore, are fixedly attached to the top perimeter wire at opposite sides of the basket. A handle for carrying the basket is secured to the top of the basket by these clips. The handle is formed with L-shaped offset ends which are insertable through the throughbores in each clip so that an elongated leg of each L-shaped end protrudes from each clip. The handle is pivotable on the clips relative to the top of the basket between an upright, vertical position and a lowered, horizontal position.

The basket is releasably mounted upon the basket supporting bracket by first inserting the bottom wire on one side of the basket into the lower hooks of the basket supporting bracket and then tilting the basket toward the handlebars of the bicycle until one of the protruding L-shaped ends of the vertically oriented handle is inserted through the vertical slot in the locking element secured to the top brace of the basket supporting bracket. The slot in the locking element is vertically oriented so that with the handle in an upright vertical position, the elongated leg of the L-shaped end of the handle aligns with the slot and is insertable therein. Once the elongated leg on the L-shaped end of the handle is inserted into the slot in the locking element, the handle is pivoted approximately 90° to a horizontal position, which, in turn, moves the elongated leg perpendicular to the vertical slot, thereby locking the top of the basket to the basket supporting bracket and preventing disengagement of the handle from the locking element.

The basket is removed from the basket supporting bracket by returning the handle to a vertical position and tilting the top of the basket away from the bicycle handlebar so as to remove the elongated sections of the L-shaped end of the handle from the slot in the bracket locking element. With the locking elements of the bicycle handle and the basket supporting bracket disengaged, the basket may be lifted from the lower hooks of the basket and carried away from the bicycle with the bracket remaining secured to the bicycle.

The basket assembly of this invention therefore permits detachment and reattachment of the basket and basket supporting bracket with a minimum of effort and time. The cooperating locking elements of the basket supporting bracket and basket are engageable with one another with the handle of the basket in an upright, basket carrying position. Once the L-shaped end of the handle is inserted within the slot in the locking element of the basket supporting bracket, the handle is simply rotated to a horizontal position atop the top perimeter wire of the basket to lock the basket to the basket supporting bracket. A minimum amount of hardware is required in the basket assembly herein, and the basket supporting bracket remains fixed to the bicycle with the basket detached.

DESCRIPTION OF THE DRAWINGS

The structure, operation and advantages of a presently preferred embodiment of this invention will become further apparent upon consideration of the following description taken in conjunction with the accompanying drawings, wherein:

FIG. 1 is a perspective view of the basket assembly of this invention in which the basket supporting bracket is shown mounted to the frame of a bicycle, shown in phantom, and the basket is mounted upon the basket supporting bracket;

FIG. 2 is a partial isometric view showing the L-shaped end of the basket handle in a position to be inserted within the locking element of the basket supporting bracket; and FIG. 3 is a front, perspective view of the basket supporting bracket mounted in position upon the frame of a bicycle.

DETAILED DESCRIPTION OF THE INVENTION

Referring now to the drawings, the basket assembly 10 of this invention includes a wire basket 12 detachably supported upon the frame 14 of a bicycle by a basket supporting bracket 18. The basket 12 includes a plurality of spaced, parallel U-shaped web wires 20 which form the bottom and sides 22, 24 of the basket. Arranged transversely to the web wires 20 are a plurality of spaced, parallel U-shaped web wires 26 which form the bottom and the other two sides 28, 30 of the basket 12. The lower, generally horizontal portion of the web wires 20 engage the lower portion of the web wires 26 and are connected thereto by welding or brazing to form the bottom 32 of basket 12. The upper ends of web wires 20, 26 are each formed with hooks 34, 36, respectively, which mount to a top perimeter wire 38. A second perimeter wire 40 is connected by welding or brazing to the web wires 20, 26 medially along each of the sides 22, 24, 28 and 30 to provide additional rigidity to the basket 12.

A pair of clips 42, 44, each formed with a through-bore 45, are mounted to the top perimeter wire 38 at approximately the midpoint of sides 22, 24, respectively. The clips 42, 44 are adapted to pivotally mount a handle 46 having offset, generally L-shaped ends 48, 50. The L-shaped ends 48, 50 are insertable within the bores 45 in clips 42, 44, respectively, so that an elongated leg 52 of the L-shaped end 48, 50 extends outwardly or protrudes from the clips 42, 44. See FIGS. 1 and 2.

The basket supporting bracket 18 is adapted to removably mount to the frame 14 of a bicycle without the need for any nuts or bolts or other attachment devices. As schematically illustrated in the drawings, the bicycle frame 14 includes handlebars 54 supported by a handlebar stem 56 which is carried by the head tube 58 of the bicycle frame 14.

The basket supporting bracket 18 includes a pair of spaced rods 60, 62 each having a rearwardly facing upper hook 64 at one end and a forwardly facing lower hook 66 at the opposite end. The rods 60, 62 are interconnected at their upper end by a U-shaped brace 68 which extends between the rods 60, 62 and is welded or brazed thereto. A locking element 70 in the form of a U-shaped locking bracket having spaced legs forming a vertical slot 72 is welded or brazed to brace 68. The lower ends of rods 60, 62 are interconnected by an M-shaped brace 74 having a center arcuate section 71 and a pair of legs 73, 75 which contact the rods 60, 62 and are welded or brazed thereto.

The basket supporting bracket 18 is mounted upon the bicycle frame 14 by placing the upper hooks 64 of rods 60, 62 over the handlebars 54 on opposite sides of the handlebar stem 56. The center arcuate section 71 of the M-shaped brace 74 rests against the head tube 58 so that the lower hooks 66 of rods 60, 62 extend outwardly from the bicycle frame 14.

With the basket supporting bracket 18 mounted in position upon the bicycle frame 14 as shown in FIG. 3, the basket 12 can then be mounted thereto. Referring to FIG. 2, the first step in mounting basket 12 upon basket supporting bracket 18 involves positioning the basket 12 so that the outermost web wire 26 at the bottom 32 of basket 12 is received within the lower hook 66 of each rod 60, 62. In this initial mounting position, the bottom 32 of the basket 12 is secured in place, but the top of the basket 12 is free to move. The top of the basket 12 is mounted to the basket supporting bracket 18, and locked in place, by interconnection of one of the L-shaped ends 48 or 50 of handle 46 with the locking element 70 of basket supporting bracket 18, as described below.

Referring to FIG. 2, with the handle 46 in an upright, vertical position, substantially perpendicular to the plane of the top perimeter wire 38, and with the outermost web wire 26 received within the lower hooks 66, the elongated leg 52 formed in the L-shaped end 50 of handle 46 aligns with the vertical slot 72 of locking element 70. By moving the top of the basket 12 toward the basket supporting bracket 18, the leg 52 enters and extends through vertical slot 72. In order to lock the basket 12 in place upon the basket supporting bracket 18, handle 46 is pivoted to a substantially horizontal position so that it rests against the top perimeter wire 38 as shown in FIG. 1. Pivoting of the handle 46 to a horizontal position moves the elongated leg 52 of the handle 46 generally perpendicular to the vertical slot 72 thus preventing the handle 46 from disengaging the locking element 70.

In order to unlock the handle 46 from the locking element 70, to permit detachment of the basket 12 from basket supporting bracket 18, the handle 46 is simply pivoted back to an upright, vertical position in which the elongated leg 52 of handle 46 aligns with the vertical slot 72. The top of the basket 12 is then moved away from the locking element 70, and the entire basket 12 lifted upwardly off of the supporting hooks 66 of the basket supporting bracket 18.

In the embodiment of the bicycle basket described hereinabove, both ends of the bicycle handle 46 are L-shaped and have an elongated leg 52 at the end thereof. As so constructed, either end of the handle may be inserted through the vertical slot 72 of locking element 70. Consequently, either side of the basket may be secured to the supporting bracket 18 locking element 70. As an alternative, only one end of the handle need be L-shaped in order to lock the basket to the supporting bracket 18. In that event, the opposite end of the handle 46 would pass through the bore 45 of the clip 42 and have a hook or loop formed in the end thereof. Alternatively, the opposite end could be secured within the bore 45 of the clip 42 by having an unthreaded lock nut secured onto its end.

While the invention has been described with reference to a preferred embodiment, it will be understood by those skilled in the art that various changes may be made and equivalents may be substituted for elements thereof without departing from the scope of the invention. For example, the upper hooks 64 of rods 60, 62 could be modified to provide for more permanent mounting of the basket supporting bracket 18 to the bicycle frame 14, and the M-shaped brace 74 of the basket supporting bracket 18 could be similarly modified. In addition, the basket supporting bracket could be modified to mount to the rear of the bicycle, and/or to mount more than one basket, while still incorporating the locking concept between the basket 12 and basket supporting bracket 18 described above.

In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A basket assembly for bicycles, comprising;
   a basket supporting bracket having hooks adapted to mount over a handlebar of a bicycle;
   a basket having a pivotable rigid wire handle, said basket being detachably mounted upon said basket supporting bracket; and
   locking means including a generally L-shaped extension on said wire handle, said extension being movable with said pivotable handle for selectively engaging said bracket and locking said basket to said basket supporting bracket and for releasably unlocking said basket from said basket supporting bracket.

2. A basket assembly for bicycles comprising:
   a basket supporting bracket having hooks adapted to mount over a handle of a bicycle, said basket supporting bracket having a first locking element;
   a basket having a pivotable rigid wire handle formed with a second locking element movable with said handle, said second locking element comprising a generally L-shaped extension on said wire handle, said basket being detachably mounted upon said basket supporting bracket; and
   said first locking element of said basket supporting bracket being selectively engageable with said second locking element of said basket handle for releasably locking said basket to said basket supporting bracket.

3. A basket assembly for bicycles comprising:
   a basket supporting bracket having hooks adapted for mounting to a handlebar of a bicycle, said basket supporting bracket having a first locking element;
   a basket having a pivotable rigid wire handle formed with a second locking element, said second locking element comprising a generally L-shaped extension on said wire handle, said basket being detachably mountable upon said basket supporting bracket; and
   said handle being movable between a first raised position wherein said second locking element is positioned in an unlocked position relative to said first locking element, and a second lowered position wherein said second locking element engages and is positioned in a locked position relative to said first locking element for locking said basket to said basket supporting bracket.

4. The basket assembly of claim 3 in which the bicycle includes handlebars and a frame having a head tube, said basket supporting bracket including:
   a pair of spaced rods having an upper end and a lower end, each rod being formed with an upper hook, said upper hooks being adapted to fit over the handlebars of a bicycle; and
   a generally M-shaped brace interconnecting the lower ends of said spaced rods, said M-shaped brace being formed with an arcuate center section adapted to rest against the head tube of the frame of the bicycle.

5. The basket assembly of claim 3 in which said basket supporting bracket includes an upper cross brace, said first locking element comprising a U-shaped locking bracket having spaced legs each mounted to said cross brace, said spaced legs forming a slot therebetween.

6. The basket assembly of claim 5 in which said basket further includes
   a top perimeter wire and a pair of clips fixedly secured on opposite sides of said top perimeter wire, each of said clips being formed with a throughbore,
   said second locking element of said handle comprising an elongated leg formed at opposite ends of said handle, each of said ends of said handle being insertable into said throughbores of said clips so that said elongated legs protrude outwardly therefrom.

7. A basket supporting bracket for mounting a basket to a bicycle having handlebars and a front fork with a head tube, said basket supporting bracket comprising:
   a pair of spaced wire rods having upper and lower ends, each of said wire rods being formed with a rearwardly facing, upper hook at said upper end and a forwardly facing, lower hook at said lower end;

said upper hooks being adapted to be received over the handlebars of the bicycle to support said basket supporting bracket upon the bicycle, said lower hooks being adapted to receive the bottom of the basket;

a generally U-shaped brace connected to and extending between said rods at said upper ends thereof, said U-shaped brace having a locking element connected thereto; and a generally M-shaped brace connected to and extending between said rods at said lower ends thereof, a central portion of said generally M-shaped brace being adapted to be placed in contact with the vertical head tube of the bicycle.

8. The bracket of claim 7 in which said locking element has a relatively long, narrow vertically extending slot formed therein.

9. In combination with the basket supporting bracket of claim 8 a wire basket, said basket comprising:

a bottom wall and side walls extending upwardly from said bottom wall, said walls all being formed by spaced, generally U-shaped wires;

a generally rectangular perimeter wire located in a horizontal plane and attached at the top of said U-shaped wires of said basket;

a pivotable wire handle secured to the top of said basket; and locking means formed on at least one end of said pivotable handle and engageable with said slot of said basket supporting bracket to releasably lock said basket to said basket supporting bracket.

10. The wire basket of claim 9 in which said locking means comprises an offset, elongated leg formed in at least one end of said handle of said basket, said elongated leg being insertable through said slot of said basket supporting bracket with said handle in an upright, vertical position, and said elongated leg being movable perpendicularly to said slot upon movement of said handle to a horizontal position to lock said handle to said basket supporting bracket.

11. A basket assembly for bicycles which include a handlebar and a frame having a head tube, said assembly comprising:

a basket supporting bracket adapted for mounting to a bicycle, said basket supporting bracket having a first locking element;

a basket having a movable handle formed with a second locking element, said basket being detachably mountable upon said basket supporting bracket;

said handle being movable between a first position wherein said second locking element is positioned in an unlocked position relative to said first locking element, and a second position wherein said second locking element is positioned in a locked position relative to said first locking element for releasably locking said basket to said basket supporting bracket; and said basket supporting bracket including a pair of spaced rods having an upper end and a lower end, each rod being formed with an upper hook, said upper hooks being adapted to fit over the handlebars of a bicycle; a generally M-shaped brace interconnecting the lower ends of said spaced rods, said M-shaped brace being formed with an arcuate center section adapted to rest against the head tube of the frame of the bicycle; and each of said spaced rods being formed with a hook on said lower end, said basket having a bottom formed with at least one wire engageable with said lower hooks of said rods for mounting said basket upon said basket supporting bracket.

12. A basket assembly for bicycles comprising:

a basket supporting bracket adapted for mounting to a bicycle, said basket supporting bracket having a first locking element;

a basket having a movable handle formed with a second locking element, said basket being detachably mountable upon said basket supporting bracket;

said handle being movable between a first position wherein said second locking element is positioned in an unlocked position relative to said first locking element, and a second position wherein said second locking element is positioned in a locked position relative to said first locking element for releasably locking said basket to said basket supporting bracket;

said basket supporting bracket including an upper cross brace, said first locking element comprising a U-shaped locking bracket having spaced legs each mounted to said cross brace, said spaced legs forming a slot therebetween;

said basket including a top perimeter wire and a pair of clips fixedly secured on opposite sides of said top perimeter wire, each of said clips being formed with a throughbore;

said second locking element of said handle comprising an elongated leg formed at opposite ends of said handle, each of said ends of said handle being insertable into said throughbores of said clips so that said elongated legs protrude outwardly therefrom;

said handle in said first position being disposed in a vertically upright position, substantially perpendicular to the plane of said top perimeter wire, said handle in said first position placing one of said elongated legs into alignment with said slot formed in said U-shaped locking bracket;

said basket being movable toward said basket supporting bracket to insert said elongated leg through said slot; and said handle in said second position being disposed in a horizontal position substantially parallel to the plane of said top perimeter wire, said handle in said second position placing said elongated leg perpendicular to said slot for locking said basket to said basket supporting bracket.

* * * * *